United States Patent [19]
Yamazaki et al.

[11] Patent Number: 5,896,240
[45] Date of Patent: Apr. 20, 1999

[54] PINCH ROLLER AND PINCH ROLLER APPARATUS HAVING A SELF-ALIGNMENT FUNCTION

[75] Inventors: Hiroyuki Yamazaki, Kyoto; Yukiharu Uemura, Kanagawa, both of Japan

[73] Assignees: Yamauchi Corporation, Osaka; Oiles Corporation, Tokyo, both of Japan

[21] Appl. No.: 08/898,589

[22] Filed: Jul. 22, 1997

[30] Foreign Application Priority Data

Jul. 29, 1996 [JP] Japan .................. 8-199281

[51] Int. Cl.⁶ .................... G11B 5/008; B65H 20/00
[52] U.S. Cl. .................... 360/90; 226/194
[58] Field of Search .................... 360/90, 93, 96.1, 360/96.2, 96.5; 226/181–187, 194

[56] References Cited

FOREIGN PATENT DOCUMENTS

| | | |
|---|---|---|
| U-60-102744 | 7/1985 | Japan . |
| A-61-115266 | 6/1986 | Japan . |
| U-3-28320 | 3/1991 | Japan . |
| A-7-65443 | 3/1995 | Japan . |
| A-7-282492 | 10/1995 | Japan . |

Primary Examiner—A. J. Heinz

[57] ABSTRACT

A pinch roller apparatus is disclosed which fully satisfies the requirements of tape running stability and durability of the bearing. A roller shaft is arranged inclined such that the tip end is close to the capstan. The angle of inclination ($\alpha$) of the roller shaft with respect to the axis of the capstan is in the range of $0°<\alpha\leq 7°$. Also, when clearance in the radial direction between the roller shaft and the plain bearing is represented by "a" and the effective length in the axial direction of the plain bearing is represented by "b", then the relation $0.002\leq a/b\leq 0.05$ is satisfied.

6 Claims, 2 Drawing Sheets

PINCH ROLLER AND PINCH ROLLER APPARATUS HAVING A SELF-ALIGNMENT FUNCTION

BACKGROUND OF THE INVENTION

1. Field of the Invention

The present invention relates to a pinch roller apparatus used for a tape recorder, a VTR or the like.

2. Description of the Background Art

A pinch roller apparatus includes a rotationally driven capstan, and a pinch roller including a roller body which is pressed against the capstan. A tape is pinched between the capstan and the roller body which are in pressure contact with each other and moved in a prescribed direction.

General requirements for the pinch roller include tape running stability and durability of the pinch roller itself. One factor for determining the tape running stability is the self-alignment function of the pinch roller. By the self-alignment function, any error in parallelism between the axis of the capstan and the pinch roller, which is inevitable in design and manufacturing, is absorbed by the play in the direction of inclination of the roller body of the pinch roller with respect to the roller shaft, whereby the axis of rotation of the roller body is made parallel to the axis of rotation of the capstan. When the pinch roller does not have such a self-alignment function or the pinch roller has a poor self-alignment function, degrading of the running stability of the tape occurs. For example, the tape pinching pressure may be biased, resulting in an irregular stretching of the tape. The tape may possibly come off of the pinch roller or the tape may deviate in the upward or downward direction, or the running speed of the tape may fluctuate, resulting in an increase in the wow and flutter.

In a typical structure of a conventional pinch roller, a roller body having an elastic body such as rubber fixed to the outer peripheral surface of a cylindrical sleeve is rotatably attached to a roller shaft by means of a ball bearing. In such a structure, very precise and small ball bearings are necessary, and hence the manufacturing costs of the pinch roller are high.

In view of the foregoing, the application of a plain bearing formed of a resin or a sintered metal which has a simple structure and is inexpensive as a pinch roller instead of the use of ball bearings has been proposed. FIG. 3 is an illustration showing a self-alignment function of the pinch roller employing a plain bearing. When roller shaft 1 is inclined with respect to a capstan C, roller body 3 is inclined with respect to roller shaft 1 because of a clearance provided between bearing 2 and roller shaft 1, so that the axis of rotation of the roller body becomes parallel to the axis of the capstan. In the figure, "T" represents a tape, 31 represents a metal sleeve and 34 represents a cylindrical elastic body.

However, when a large clearance is provided between bearing 2 and roller shaft 1, only the upper or lower end of the bearing will be brought into contact with the roller shaft, resulting in local sliding, which causes severe friction at the upper and lower ends of the bearing, promoting local wear. Therefore, it becomes difficult to satisfy the requirement of durability of the pinch roller.

In a structure such as shown in FIG. 3, it is possible that the roller body is largely inclined not only with respect to the direction of the capstan but also with respect to the direction of the running tape, orthogonal thereto. When the roller body in inclined significantly in the direction of tape running by some cause such as vibration or shock at the time of mode switching, the roller body and the capstan will be in point contact and not in line contact. In this case, pressure is not applied uniformly in the widthwise direction of the tape pinched therebetween, causing irregular stretch of the tape. In addition, the wow and flutter are increased because of snaking or upward/downward movement of the tape, so that it is difficult to satisfy the tape running stability.

SUMMARY OF THE INVENTION

An object of the present invention is to provide a pinch roller using a plain bearing which effectively exhibits a self-alignment function and fully satisfies the requirements of a pinch roller apparatus including durability and tape running stability. The present invention also provides a pinch roller apparatus containing such a pinch roller.

The pinch roller, in accordance with the present invention, includes a roller shaft, and a cylindrical roller body with a surface formed of an elastic material rotatably attached to the roller shaft by means of a plain bearing. In such a pinch roller, the feature of the present invention resides in the fact that the relationship $0.002 \leq a/b \leq 0.05$ is satisfied, where "a" represents clearance in radial direction between the roller shaft and the plain bearing, and "b" represents effective length, in the axial direction, of the plain bearing.

The plain bearing is formed of a resin or a metal. In one embodiment, the plain bearing is formed of a resin selected from the group consisting of polyolefins, fluoride resins, polyamides, polyoxymethylene, polyesters, polyethersulfone, polyphenylenesulfide, polyetheretherketone and a thermoplastic elastomer. In another embodiment, the plain bearing is formed of an oil impregnated metal.

The pinch roller apparatus in accordance with the present invention includes a rotationally driven capstan, an arm movable toward or away from the capstan, a roller shaft having its base end attached to the arm, and a cylindrical roller body with a surface formed of an elastic material and rotatably attached on the tip end side of the roller shaft by means of a plain bearing. The roller body is pressed against the capstan when the arm is moved toward the capstan.

In such a pinch roller apparatus having the above described structure, the feature of the present invention resides in that the roller shaft has its tip end inclined to be close to the capstan, that the angle of inclination ($\alpha$) of the roller shaft with respect to the axis of the capstan is within the range of $0° < \alpha \leq 7°$, and that the relation $0.002 \leq a/b \leq 0.05$ is satisfied, where "a" represents the clearance, in the radial direction, between the roller shaft and the plain bearing and "b" represents the effective length in axial direction of the plain bearing.

According to the present invention, the roller shaft is arranged to be inclined in advance at an angle of inclination of at most 7° with respect to the axis of the capstan. When the roller body is pressed against the capstan, the roller shaft is pushed back by the reaction force so as to be parallel to the capstan. Therefore, the axis of the capstan, the axis of rotation of the roller body and the axis of the roller shaft are approximately parallel to each other, and the self-alignment function provided by the clearance between the bearing and the roller shaft is almost unnecessary. As a result, the bearing and the roller shaft come to be in line contact, whereby wear of the bearing is suppressed and the life of the pinch roller is improved.

As described above, according to the present invention, when the roller body is pressed against the capstan, the capstan and the roller shaft are made to be approximately parallel to each other automatically by the reaction force, and therefore the width necessary for the self-alignment function provided by the inclination of the roller body with respect to the roller shaft can be minimized. In the present invention, the width for alignment is defined to be $0.002 \leq a/b \leq 0.05$.

Since the width for self-alignment is minimized as described above, the roller body does not incline very much with respect to the tape running direction, even when it receives the shocks created at the time of mode switching, and therefore irregular stretch or snaking of the tape as well as wow and flutter can be suppressed, whereby a good tape running stability is ensured.

As described above, the bearing is formed of a resin or metal. When the bearing is formed of a metal, oil impregnated metal is preferable, in view of the desire for lubrication.

When the bearing is formed of a resin, the preferable resins include polyolefins such as polyethylene, polypropylene or copolymers thereof, a fluoride resin such as polytetrafluoroethylene, tetrafluoroethylene-perfluoroalkylvinylether copolymer, tetrafluoroethylene-hexafluoropropylene copolymer, ethylene-tetrafluoroethylene copolymer, polychlorotrifluoroethylene, polyvinylidenefluoride or the like, polyamides such as nylon 6 and nylon 66, polyoxymethylenes such as an acetal copolymer or an acetal homopolymer, polyesters such as polybutyleneterephthalate, polyethersulfone, polyphenylenesulfide, polyetheretherketone, and thermoplastic elastomers such as a polyester thermoplastic elastomer. Among these, when the bearing is formed of any of the fluoride resins, polyolefins and polyesters, lubricity and durability of the bearing itself are superior, and, in addition, durability of the pinch roller as a whole can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
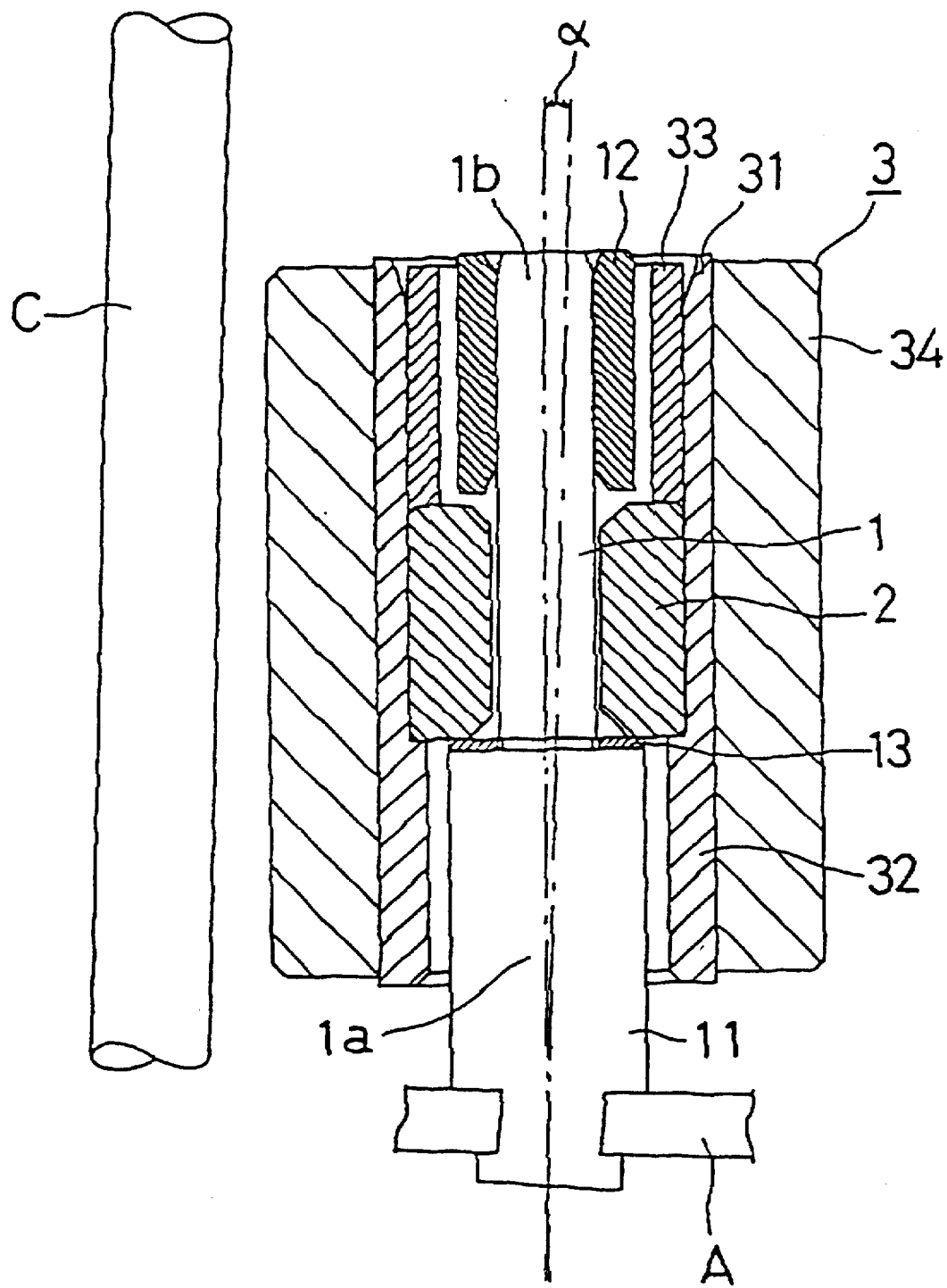
FIG. 1 is a vertical sectional view showing one embodiment of the present invention.

Referring the FIG. 1, the pinch roller includes a roller shaft 1, and a cylindrical roller body 3 formed of an elastic material and rotatably attached to roller shaft 1 by means of a plain bearing 2.

Roller body 3 includes a cylindrical elastic body 34 formed of a synthetic rubber or the like fixed on an outer peripheral surface of a metal sleeve 31 formed of aluminum, brass or the like. Roller body 3 together with bearing 2 rotates around roller shaft 1. As for the method of attaching bearing 2 in roller body 3, in the embodiment of FIG. 1, an engaging portion 32, protruding inward, is provided at one end on an inner peripheral surface of sleeve 31, and bearing 2 is supported by the upper end of the engaging portion 32. The position of bearing 2 is fixed by a retention member 33 fit in sleeve 31. A stopper member 12 is fit in the tip end 1b of roller shaft 1. The stopper member 12 is provided to prevent movement of roller body 3 in the axial direction of roller shaft 1. However, its function is not limited thereto.

Roller shaft 1 is attached to arm A such that its tip end 1b is inclined in advance with respect to the axis of capstan C to be closer to capstan C. In the figure, reference number 13 denotes a washer and 11 denotes a caulking member. While roller shaft 1 is arranged inclined in advance, it is pushed back by the reaction force from capstan C when roller body 3 is pressed against capstan C and, in this state, the axis of rotation of roller shaft 1 is approximately parallel to the axis of capstan C.

In the embodiment shown in FIG. 1, the inclination of roller shaft 1 is set, as it is attached in an inclined manner with respect to the attachment surface of arm A by means of the caulking member 11 and the washer 13. However, the means for adjusting the inclination is not limited to that shown in the figure, and any arbitrary system may be selected. For example, arm A itself, on which roller shaft 1 is attached, may be inclined so that the roller shaft 1 is inclined with respect to capstan C.

When the angle ($\alpha$) of inclination of roller shaft 1 with respect to the axis of capstan C is not larger than 0°, capstan C and the roller shaft 1 will not be parallel to each other, even when roller body 3 is pressed against capstan C. Meanwhile, when the angle ($\alpha$) of inclination is larger than 7°, the capstan C and roller shaft 1 will not be parallel to each other even when roller body 3 is pressed against capstan C, since its reaction force is too small to offset the inclination of roller shaft 1 for attaining the parallel state. In either case, it is not possible to compensate for such a deviation from parallel through a self-alignment function with the width for self-alignment described later. Therefore, the angle ($\alpha$) of inclination of the roller shaft 1 must be in the range of $0° < \alpha \leq 7°$. More preferable the range is $0° < \alpha \leq 3°$. The angle ($\alpha$) of inclination refers to an angle between the axis of roller shaft 1 and axis of capstan C in a state immediately before roller body 3 is pressed against capstan C.

Bearing 2, in the embodiment shown in FIG. 1, is a plain bearing having a pipe shape with a circular cross section and formed of a resin. Each edge is chamfered to remove burrs generated at the time of molding.

Figure 2:
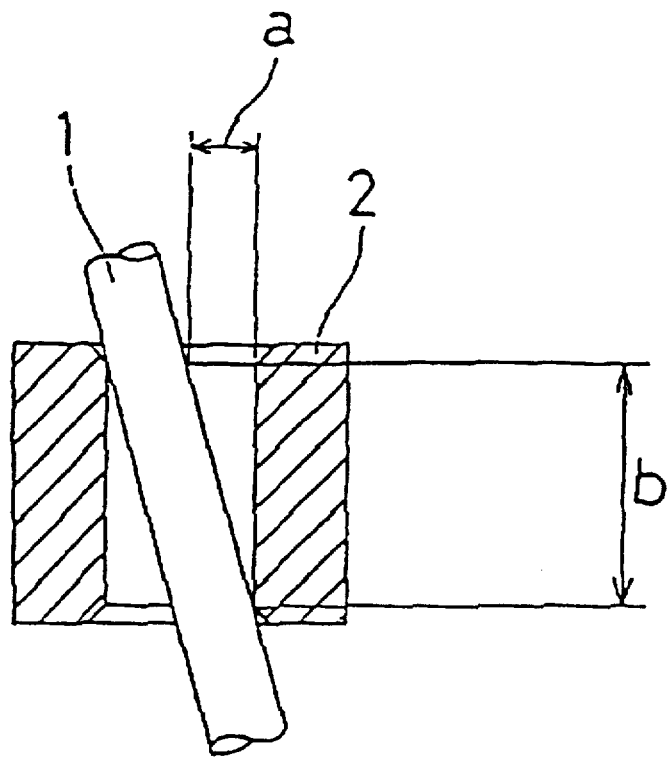
FIG. 2 is a vertical section schematically showing relation between the roller shaft and the bearing.
Figure 3:
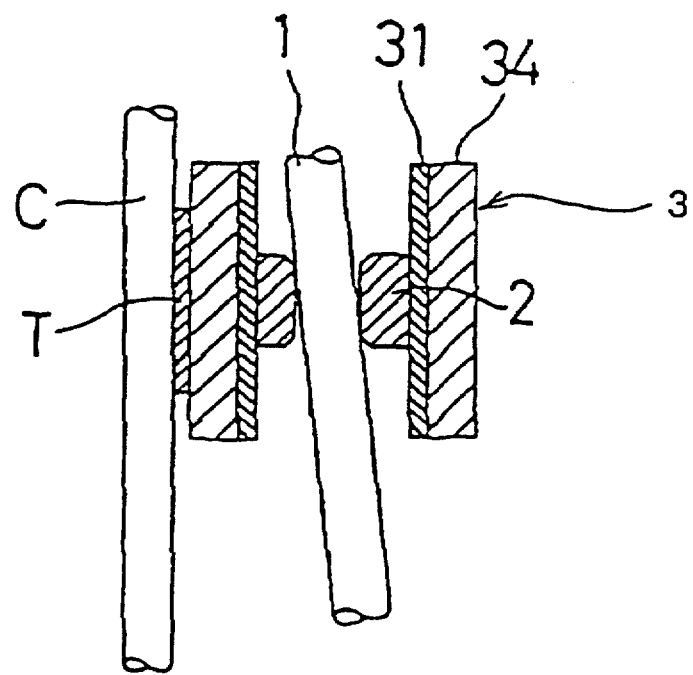
FIG. 3 is a vertical sectional view showing a conventional pinch roller apparatus.

The width for self-alignment of the pinch roller is defined dependent on the relation between the inner shape of bearing 2 and the diameter of the roller shaft 1 inserted therein. More specifically, referring to FIG. 2, the width for self-alignment can be represented as a/b, that is, the ratio of clearance (a) between the outer peripheral surface of roller shaft 1 and inner peripheral surface of bearing 2 and the effective length (b) in the axial direction of bearing 2, when the roller shaft is inclined as much as possible with respect to bearing 2. When a/b, the width for self-alignment, is less than 0.002, the self-alignment function fails, and even a very small deviation from parallel between capstan C and roller shaft 1 cannot be accommodated. Meanwhile, when a/b, the width for self-alignment, is greater than 0.05, the roller body 3 is inclined too much in the direction of the running tape, thereby hindering the tape running stability. Therefore, it is necessary that the width a/b for self-alignment is in the range of $0.002 \leq a/b \leq 0.05$. More preferably, the upper limit of a/b is 0.03 and the lower limit is 0.01.

As for the material of bearing 2, a resin having self-lubricating properties is preferred. Materials having as small a coefficient of friction as possible and superior wear resistance may be arbitrarily selected. For example, the resin may be selected from the group consisting of polyolefins, fluoride resins, polyamides, polyoxymethylenes, polyesters, polyethersulfones, polyphenylenesulfide, polyetherketone and thermoplastic elastomers can be used. Use of a fluoride resin, a polyolefin or a polyester is preferred, since lubrication and durability of the bearing itself are superior and, in addition, the durability of pinch rollers, as a whole, can be improved.

By using a bearing formed of resins having superior lubrication, it becomes unnecessary to provide any lubricant between roller shaft 1 and bearing 2. However, it goes without saying that the use of a lubricant such as grease is not prohibited, and such a lubricant may be used arbitrarily.

A metal may be selected as the material for the plain bearings 2. In view of the desired lubrication, oil impregnated metal is preferred.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pinch roller for pressing a tape against a rotationally driven capstan which comprises a roller shaft, a cylindrical roller body having a surface made of an elastic material, a cylindrical plain bearing having an outer surface fixed to an inner surface of said roller body and having an inner surface which functions as a bearing surface, facing an outer surface of said roller shaft with a clearance in a radial direction, said roller body performing a self-alignment function with respect to the roller shaft by receiving a reaction force from the capstan, wherein the relationship $0.002 \leq a/b \leq 0.05$ is established in which "a" represents the clearance in the radial direction between the roller shaft and the bearing surface of the plain bearing and "b" represents the effective length of the bearing surface of the plain bearing in the axial direction, the range of self-alignment between the roller body being determined so as to satisfy said relationship.

2. The pinch roller according to claim 1, wherein said plain bearing is made of a resinous material.

3. The pinch roller according to claim 1, wherein said plain bearing is made of resin selected from the group consisting of a polyolefin, a fluoride resin, a polyamide, a polyoxymethylene, a polyester, a polyethersulfone, a polyphenylenesulfide, a polyetheretherketone and a thermoplastic elastomer.

4. The pinch roller according to claim 1, wherein the plain bearing is made of metal.

5. The pinch roller according to claim 1, wherein the plain bearing is made of an oil impregnated metal.

6. A pinch roller for pressing a tape against a rotationally driven capstan which comprises an arm movable toward and away from said capstan, a roller shaft having a tip end and a base end, said base end being attached to said arm, and a cylindrical roller having a surface made of an elastic material and in rotatable engagement on said tip end side of said roller shaft by means of a cylindrical plain bearing having an outer surface fixed to an inner surface of said roller body and having an inner surface which functions as a bearing surface, facing an outer surface of said roller shaft with a clearance in a radial direction, said roller body being pressed against said capstan when said arm is moved toward said capstan, said roller body performing a self-alignment function with respect to the roller shaft by receiving a reaction force from the capstan, said roller shaft having said tip and inclined toward said capstan, wherein the angle ($\alpha$) of inclination of said roller shaft with respect to the axis of said capstan is in the range of $0° < \alpha \leq 7°$, and wherein the relationship $0.002 \leq a/b \leq 0.05$ is established, in which "a" represents the clearance in the radial direction between the roller shaft and the bearing surface of the plain bearing and "b" represents the effective length of the bearing surface of the plain bearing in the axial direction, the range of self-alignment between the roller body being determined so as to satisfy said relationship.

* * * * *